United States Patent [19]
Kang et al.

[11] Patent Number: 5,795,920
[45] Date of Patent: Aug. 18, 1998

[54] POLYMERIC DOPE SOLUTION FOR USE IN THE PREPARATION OF AN INTEGRALLY SKINNED ASYMMETRIC MEMBRANE

[75] Inventors: Yong Soo Kang; Bumsuk Jung; Un Young Kim, all of Seoul, Rep. of Korea

[73] Assignee: Korea Institute of Science and Technology, Seoul, Rep. of Korea

[21] Appl. No.: 667,627

[22] Filed: Jun. 21, 1996

[30] Foreign Application Priority Data

Aug. 21, 1995 [KR] Rep. of Korea ............... 95-25635

[51] Int. Cl.$^6$ .................................................. C08J 9/28
[52] U.S. Cl. ............... 521/64; 210/500.39; 210/500.41; 264/41; 524/155; 524/233; 524/538; 524/609
[58] Field of Search .................... 521/64; 624/155, 624/233, 538, 609; 210/500.39, 500.41; 264/41

[56] References Cited

U.S. PATENT DOCUMENTS

| | | |
|---|---|---|
| 3,133,132 | 5/1964 | Loeb et al. . |
| 4,230,463 | 10/1980 | Henis et al. . |
| 4,774,039 | 9/1988 | Wrasidlo ........................... 264/41 |
| 4,871,494 | 10/1989 | Kesting . |
| 4,880,441 | 11/1989 | Kesting et al. . |
| 4,902,422 | 2/1990 | Pinnau et al. . |
| 5,061,301 | 10/1991 | Kim et al. . |

OTHER PUBLICATIONS

Journal of Polymer Science: Part C: Polymer Letters, vol. 27, pp. 187–190, 1989, R. E. Kesting, "The Solvent Size Effect: Solvents and Solvent Complexes Viewed as Transient Templates Which Control Free Volume in the Skins of Integrally–Skinned Phase Inversion Membranes".

Journal of Membrane Science, vol. 60, pp. 219–232, 1991, Yong Soo Kang, et al., "Asymmetric Membrane Formation via Innersion Precipitation Method. I. Kinetic Effect".

*Primary Examiner*—Morton Foelak
*Attorney, Agent, or Firm*—Oblon, Spivak, McClelland, Maier & Neustadt, P.C.

[57] ABSTRACT

A polymeric dope solution comprising a polymeric material and a mixed solvent as a solvent system for use in the preparation of an integrally skinned asymmetric membrane having a surface layer (selective surface layer) and a porous support layer, which is useful as a gas separation membrane, is disclosed. Also disclosed are a process for the preparation of the asymmetric membrane using the polymeric dope solution, and an integrally skinned dope solution prepared thereby.

The asymmetric membranes according to the present invention show good gas permeability and high permselectivity.

2 Claims, No Drawings

5,795,920

POLYMERIC DOPE SOLUTION FOR USE IN THE PREPARATION OF AN INTEGRALLY SKINNED ASYMMETRIC MEMBRANE

BACKGROUND OF THE INVENTION

1. Field of the Invention

The present invention relates to a polymeric dope solution for use in the preparation of an integrally skinned asymmetric membrane which is useful as a gas separation membrane, having a surface layer (selective surface layer) and a porous support layer. The present invention also relates to a process for preparing the asymmetric membrane by dry-wet phase inversion of the polymeric dope solution, and to the integrally skinned asymmetric membrane thus obtained.

2. Description of the Prior Art

A variety of studies on gas separation with a separation membrane have been performed because the method of using a separation membrane has an advantage of saving more energy compared to the distillation method, PSA (pressure swing adsorption), and so on. U.S. Pat. No. 3,133,132 to Loeb and Sourirajan first suggests a process for preparing cellulose acetate membranes for desalination of water. Thereafter, efforts to develop new processes for preparing separation membranes have been continued, and many of these processes have been successfully commercialized and applied to various industries.

It is possible to obtain asymmetric membranes for gas separation with an ultrathin surface layer and a porous support film having a low permeation resistance by phase separation. Although they have high gas permeability, most of the membranes prepared by these processes have drawbacks that the membranes generally have poor permeation selectivity (hereinafter, referred to as the "permselectivity") due to minute defects (having a size of 1000 Å or less) in the surface layer. Therefore, these membranes had to be subject to post-processing, such as coating, in order to mitigate the adverse effects such as minute defects. U.S. Pat. No. 4,230,463 to Henis and Tripodi proposes that a polymeric separation membrane with a good permeability, called a thin composite membrane, can be prepared by coating a membrane with silicone to avoid problems such as minute defects. Since then, most of the membranes for gas separation have been prepared in the form of thin composite films.

Recently, a process for preparing a membrane for gas separation having improved permeability was disclosed in U.S. Pat. Nos. 4,871,494 and 4,880,441, both to Kesting et al, which comprises preparing a membrane by using an acid-base complex solvent and then coating the surface thereof with silicone. Kesting discovered that, upon preparing a polymeric solution, the larger the volume size of the solvent is, the bulkier the free volume of the surface layer becomes (See, Journal of Polymer Science: Part C; Polymer Letters, vol. 27, 187–190, 1989). In addition, Kang et al have prepared asymmetric separation membranes having a surface layer with a high free volume by increasing the diffusion rate of a non-solvent at the interfaces between the polymeric solution and the non-solvent precipitating solution so as to increase the precipitation rate of the polymeric solution (See, Journal of Membrane Science, vol. 60, 219–232, 1991). Based on these facts, it is believed that the prior art processes use an acid-base complex as a solvent in order to prepare a membrane having a well-developed asymmetric structure and increased free volume by increasing the molecular size of the solvent in the polymeric solution to result in a large free volume of the surface layer and further by increasing the diffusion rate of the non-solvent into the polymeric solution when the polymeric solution is precipitated.

According to the Kesting et al and Kang et al processes, a thin composite membrane can be prepared by initially spinning or casting a separation membrane and then coating the surfaces of the membrane with a third material in order to avoid minute defects which may be present in the surface layer of the membrane.

Particularly, it is possible to considerably increase selective permeability by thin-coating the membrane with a third material such as silicone which has good permeability and thus makes the coating process easier, although the permeability is slightly decreased. However, the processes involved in such a coating process might lower the productivity of the membranes.

SUMMARY OF THE INVENTION

The object of the present invention is, therefore, to provide a polymeric dope solution for use in the preparation of an integrally skinned asymmetric membrane in either hollow fiber or flat sheet form.

Another object of the present invention is to provide a process for preparing an integrally skinned asymmetric membrane for gas separation capable of being produced without minute defects on the surface layer.

Still another object of the present invention is to provide an integrally skinned asymmetric membrane for gas separation which is defect-free and prepared by the above-mentioned process.

Further objects and advantages of the invention will become apparent through reading the remainder of the specification.

DETAILED DESCRIPTION OF THE INVENTION

In order to avoid the possible defects on the surface layer of the asymmetric membrane, the polymer on the surface of the polymeric solution must be present in a high concentration immediately before the phase inversion of the polymeric solution occurs. If the polymer is present in a high concentration on the phase inversion, viscosity of the solution increases, thereby the probability of occurrence of the defects is considerably reduced when the surface layer is formed during the phase separation.

Particularly, it is important that the polymeric solution must have viscosity to overcome the osmotic pressure occurring at the contact of the polymeric solution with a non-solvent so that the surface of the membrane may be free from the defects.

When the polymeric solution contacts a non-solvent in the precipitating solution, an exchange between the solvent and the non-solvent occurs. At this stage, it is possible to control the concentration of the polymer by adjusting the rate of such exchange at the surface of the polymeric solution at the time of the phase inversion. The exchange rate of the solvent/non-solvent at the contact of the polymeric solution with the non-solvent in the precipitating solution will be the most important parameter for controlling the structure of the separation membrane. Therefore, the manufacture of a separation membrane with good separation performance depends on how well such parameter is controlled.

It is possible to increase the surface concentration of the polymeric solution immediately before the phase inversion by selecting a strong volatile solvent and vaporizing the solvent during the contact of the polymeric solution with air before the polymeric solution contacts the non-solvent in the precipitating solution. During the vaporization, in order to facilitate the vaporization of the solvent, a forced convection system may be used (See, U.S. Pat. No. 4,902,422 to I. Pinnau and W. J. Koros). Alternatively, the concentration of the polymer can also be instantaneously increased at the interface between the polymeric solution and the non-solvent if at the time the exchange between the solvent and the non-solvent occurs, the diffusion rate of the solvent in the polymeric solution into the non-solvent in the precipitating solution is higher than that of the non-solvent in the precipitating solution into the polymeric solution.

Therefore, for the preparation of an integrally skinned asymmetric gas separation membrane having improved properties, it is very advantageous to increase the precipitation velocity of the polymeric solution by controlling the diffusion rate of the non-solvent in the precipitating solution when the polymeric solution contacts the non-solvent, increase free volume of the surface layer of the polymeric solution by freezing the structure of the membrane in solution, and increase the viscosity of the solution by making the diffusion velocity of the solvent more rapid in order that the concentration of the polymer at the interface of the polymeric solution increases. That is, at the moment the separation membrane is structurally formed the concentration of the polymer is increased so that the mechanical strength at the interface becomes high enough to avoid minute defects in the surface layer; thus an integrally skinned asymmetric membrane free from the minute defects can be prepared.

We, the inventors of the present invention, have conducted extensive studies on gas separation membranes with the interfacial condition mentioned above, for the purpose of removing the minute defects on the surface layer encountered in the prior art techniques. As a result, we have found that a solvent in the polymeric solution must first be the one which can dissolve the polymer and be rapidly diffused into the precipitating solution when it contacts the non-solvent. We have also found that the concentration distribution of the polymer is a critical factor in determining the final condition of the membrane as mentioned above. The present invention has now been accomplished on the basis of the foregoing study.

In one aspect, the present invention provides a polymeric dope solution for the production of an integrally skinned asymmetric membrane in either hollow fiber or flat sheet form by dry-wet phase inversion, which comprises:

(a) a polymeric material selected from the group consisting of polysulfone, polyethersulfone, polyimide, polyetherimide, and a mixture thereof;

(b) a mixed solvent of a main solvent and a co-solvent, the main solvent being selected from the group consisting of N-methyl pyrrolidone, dimethyl formamide, dimethyl acetamide, and dimethyl sulfoxide, the co-solvent being selected from the group consisting of tetrahydrofurane, dioxane, methylene chloride, methyl acetate, ethyl acetate, propyl acetate, chloroform, and a mixture thereof, and the ratio by weight of the main solvent to the co-solvent being within the range of from about 9:1 to about 1:1; and (c) an additive selected from the group consisting of formic acid, ethanol, and methanol;

wherein the ratio by weight of the polymeric material (a) to the mixed solvent (b) being within the range of from about 1:6 to about 2:3.

In another aspect, the present invention provides a process for preparing an integrally skinned asymmetric membrane for gas separation having a selective surface layer and a porous support layer by dry-wet phase inversion, which comprises the steps of:

(a) preparing a polymeric dope solution;

(b) removing air bubble from the dope solution;

(c) forming a hollow fiber or a flat sheet from the dope solution by spinning or casting in water or brine;

(d) dipping the resulting fiber or the sheet into water to remove the solvent;

(e) substituting an alcohol for the water, or substituting an alcohol and subsequently an alkane for the water; and (f) drying the fiber or the sheet;

wherein the improvement comprising using said polymeric dope solution.

In yet another aspect, the invention provides an integrally skinned asymmetric membrane for gas separation having a selective surface layer with apparent thickness of less than 1,000 Å, selectivity of more than 80% of the intrinsic selectivity of the polymeric material and a Tg higher than the intrinsic Tg of the polymeric material, which is prepared according to the aforementioned process.

The concentration profile of each of the solvent and the polymer will depend on the surface tension of each component of the polymeric solution. That is, when the surface tension of the solvent is lower than that of the polymer, the concentration of the solvent having low surface tension on the surface of the polymeric solution, i.e., the interface between the polymeric solution and air, increases. However, if the surface tension of the solvent is higher than that of the polymer, the concentration of the polymer on the surface of the polymeric solution increases. However, there is no solvent simultaneously satisfying both good solubility and high surface tension. Although it is difficult to find a polymeric solution having high concentration of the polymer on the surface thereof in thermodynamic equilibrium, it is possible to increase the concentration of the polymer on the surface of the polymeric solution dynamically during the phase separation. In other words, it is possible to increase the concentration of the polymer on the surface of the solution during the phase inversion with two or more solvents having different surface tensions so that a solvent having surface tension lower than that of the polymer migrates toward the surface of the solution and another solvent having higher surface tension than that of the polymer remains in the middle part of the solution. Therefore, when the solvent system consisting of two or more solvents is used, it is important to select a main solvent in which the polymer is highly soluble and a co-solvent having lower surface tension than that of the main solvent so that the co-solvent can migrate toward the surface of the solution. The polymer and the mixed solvent must be present in an appropriate ratio, such as 1:6 to 2:3.

In order to prepare a separation membrane having a defect-free thin surface layer with high free volume, the non-solvent in the precipitating solution should be rapidly diffused into the polymeric solution when the polymeric solution contacts the precipitating solution, and concurrently the solvent in the polymeric solution should be diffused at a more rapid rate than the diffusion rate of the non-solvent.

The mixed solvents which may be used in the process of the present invention include any solvents known in the art for the preparation of separation membranes. Preferred examples of main solvents include N-methyl pyrrolidone, dimethyl formamide, dimethyl acetamide, and dimethyl sulfoxide. Examples of co-solvens include methyl acetate, ethyl acetate, propyl acetate, tetrahydrofurane, dioxane, methylene chloride, chloroform and mixtures thereof. The properties of these solvents are summarized in Table 1 hereinbelow.

A preferable ratio of the main solvent to the co-solvent is 9:1 to 1:1. When the mixing ratio is less than 1:1, the mixed solvent is not strong enough to dissolve the polymer for obtaining a dope solution. On the other hand, if the mixing ratio exceeds 9:1, a membrane with a finger-like structure can be formed and is not suitable for gas separation purpose.

The polymers which can be used in the present invention are known in the art, and thus may be properly selected from any conventional polymer depending on the desired use of the membrane. The preferred polymers are polysulfone, polyethersulfone, polyimide, polyetherimide, and derivatives thereof. Polysulfone, polyethersulfone and polyimide are commercially available under the trade name Udel P-3500 from Amoco, USA, Ultrason E Series from BASF, Germany, and Ultem-1000 from General Electric, USA, respectively. Polyetherimide is available from Aldrich, USA.

For carrying out the process of the present invention, it may be possible to add a solvent additive to the polymeric solution which are conventionally used in the preparation of polymeric solutions so that the non-solvent in the precipitating solution can be diffused into the polymeric solution. Such solvent additives must have non-solvent properties and also must be capable of increasing the velocity of precipitation of the polymeric solution [See, Y. S. Kang, H. J. Kim & U. Y. Kim, J. Memb. Sci. 60, 219–232, 1991]. Examples of those solvent additives include formic acid, ethanol, methanol, and the like.

Generally, as the precipitation velocity of the polymeric solution increases, the permeability increases due to the increase of the free volume of the surface layer of the solution. Also, because the solvent additive will migrate toward the surface or the middle part of the polymeric solution depending on its surface tension, the surface tension of the solvent additive will be a critical factor in selecting the additives. In particular, upon the preparation of the membrane, a shear stress is provided in the vertical direction of the surface of the membrane at the interface between the polymeric solution and a nozzle or casting knife, resulting in the changes both in the concentration and the structure of polymer chains. A solvent additive having low surface tension and low molecular weight can migrate toward the interface rapidly.

Accordingly, if the diffusion rate of the solvent having low surface tension through the non-solvent of the precipitating solution is very high, the probability of defect formation at the surface layer is remarkably reduced, and thus it is possible to prepare an asymmetric membrane for gas separation of which surface layer is very thin and defect-free.

For the process of the present invention, a bore liquid can also be used. Unlike the flat membrane, a membrane made of hollow fibers requires the use of a bore liquid. The composition of the bore liquid considerably affects the structure of the bottom layer, the resistance to permeation, etc. of the membrane. Accordingly, the composition of the bore liquid plays an important role in the performance of the separation membrane. An example of conventionally used bore liquids is a mixture of a non-solvent and a solvent. If the concentration of the added solvent is high, the structure of the bottom layer is opened accordingly. Thus, it is possible to reduce the resistance to permeation. However, such high concentration of the solvent may cause difficulties in use. Accordingly, it is possible to prepare the separation membrane having a bottom layer consisting of open cells with improved functions by adding a mid- or high-molecular-weight material to the bore liquid to increase its viscosity. The bore liquids which may be used include water, a mixture of water and the main solvent and/or co-solvent previously mentioned, or an aqueous polyethyleneglycol solution.

The precipitating solutions which may be generally used in the present invention include water and brine. If brine is used as the precipitating solution, a salt, such as LiCl, NaCl and $CaCl_2$, is typically added. Alternatively, it is possible to use methanol, ethanol, isopropyl alcohol and the like as a precipitating solution depending on the solvent used in the polymeric solution. As described above, since the velocity of exchange of the solvent/non-solvent upon contacting the polymeric solution with the non-solvent of the precipitating solution is the most important parameter in determining the structure of the separation membrane, it can be adjusted by varying the kind and the composition of the precipitating solution in the given polymeric solution.

TABLE 1

Physical properties of solvent, co-solvent and non-solvent additives used in the present invention

| Solvent | Boiling Point (at 1 atm) | Density (g/cm$^3$) | Solubility Parameter (cal$^{1/2}$cm$^{-3/2}$) | Surface Tension (dyne/cm) |
|---|---|---|---|---|
| NMP | 202 | 1.0259 | 11.3 | 40.7 |
| DMF | 153.0 | 0.94387 | 12.1 | 36.42 |
| DMAC | 166.1 | 0.936337 | 10.8 | 32.43* |
| DMSO | 189.0 | 1.09537 | 12.0 | 42.98 |
| Dioxane | 101.320 | 1.02797 | 10.13 | 32.80 |
| THF | 65.965 | 0.8892** | 9.9 | 26.4 |
| Methyl acetate | 56.868 | 0.9279 | 9.6 | 24.1 |
| Ethyl acetate | 77.111 | 0.89455 | 9.1 | 23.75** |
| Propyl acetate | 101.536 | 0.88303 | 8.8 | 24.28** |
| Dichloromethane | 39.64 | 1.31678 | 9.88 | 27.89** |
| Chloroform | 61.178 | 1.47970 | 9.49 | 26.53 |
| Acetic anhydride | 140.0 | 1.06911* | 10.3 | 31.90 |
| Acetic acid | 117.885 | 1.04392 | 10.1 | 27.42** |
| Formic acid | 100.56 | 1.21405 | 12.1 | 37.58** |
| Methanol | 64.546 | 0.78637 | 14.5 | 22.30 |
| Ethanol | 78.293 | 0.78493 | 12.78 | 22.32** |
| Water | 100.00 | 0.99705 | 23.53 | 71.81 |

*determined at 30° C.
**determined at 20° C.

The permeance $(P/l)_i$ of a gas for the separation membrane according to the process of the present invention can be determined by the following equation:

$$(P/l)_i = \frac{\text{amount of traversed gas}}{\text{area} \cdot \text{time} \cdot \text{pressure}}$$

An ideal separation factor $\alpha_{ij}$ is defined as the ratio of the gas permeances of two gases i and j, as represented below:

$$\alpha_{ij} = \frac{(P/l)_i}{(P/l)_j}$$

The permeance is given by the unit, cm$^3$(STP)/cm$^2$·sec·cmHg.

If, separating a gas from mixed gases by means of a separation membrane, selectivity of such mixed gases is 80% or more of the intrinsic selectivity of the polymeric material (gas selectivity by means of a dense polymeric film), the separation membrane would be regarded as not having surface defects. In the examples according to the present invention, polysulfone was used as the polymeric material for the separation membrane. Polysulfone films have an ideal separation factor of oxygen over nitrogen, α of 5.6 [See. J. S. McHattie, W. J. Koros, D. R. Paul, Polymer, Vol 32, 840 (1991)]. If the surface of a separation membrane has no defect, permeability of a gas is predominantly carried out by the mechanism of dissolution/diffusion [See, U.S. Pat. No. 4,902,422 issued to L Pinnau and W. J. Koros]. At this time, apparent effective selective layer thickness (L) of the membrane can be evaluated by the following equation from the intrinsic permeability of polysulfone to oxygen gas ($Po_2$) of $1.1 \times 10^{-10}$ $cm^3$ (STP)cm/$cm^3$·sec·cmHg and a determined value of the permeance of oxygen (($P/l)o_2$) to the membrane of the present invention:

$$L = \frac{Po_2}{(P/l)o_2}$$

In addition, an increase in the free volume of the membrane may be identified by measuring the first heat glass transition temperature (Tg) by means of a DSC (differentiated scanning calorimeter) [See, Journal of Membrane Science, vol. 54, 29–50, 1990]. It is known that the polysulfone membrane has a higher Tg than 190° to 191° C. which is the intrinsic Tg of the polysulfone itself, as the free volume of the membrane increases. Therefore, an increase in the free volume of the separation membrane may be identified by measuring the first heat glass transition temperature and the reheat glass transition temperature.

DESCRIPTION OF THE PREFERRED EMBODIMENTS

The present invention will be illustrated in greater details by way of the following examples. The examples are presented for illustrative purpose only and should not be construed as limiting the invention, which is properly delineated in the claims.

EXAMPLES 1 TO 4

A polymeric solution was prepared using 27% by weight of polysulfone and a mixed solvent consisting of 60% by weight of DMF, 35% by weight of THF and 5% by weight of ethanol. After removing air bubbles under vacuum (about 10 to 50 torr), the solution was spun by means of a spinning apparatus. At this stage, water/DMF having the composition specified in Table 2 below and purified water were used as a bore liquid and a precipitating solution, respectively. The spun fiber was dipped into a water bath for 24 hours to remove the solvent. The fiber was removed from the water bath and immersed into a methanol bath for 10 to 24 hours. The film was then dried for 24 to 30 hours at room temperature. The film was subjected to measurement of gas permeability with a bubble flow meter under 5 atm of a pure gas. The results are shown in Table 2 below.

TABLE 2

| Sample | 1 | 2 | 3 | 4 |
|---|---|---|---|---|
| Bore liquid composition (wt/wt) | 100/0 | 85/15 | 80/20 | 90/10 |
| P/l($O_2$)* | 27.1 | 28.5 | 28.2 | 26.5 |
| P/l($N_2$)* | 5.4 | 4.5 | 5.3 | 4.8 |

TABLE 2-continued

| Sample | | 1 | 2 | 3 | 4 |
|---|---|---|---|---|---|
| P/l($CO_2$)* | | 54.4 | 50.6 | 49.5 | 43.1 |
| P/l($CH_4$)* | | 1.9 | 2.4 | 2.4 | 1.8 |
| α($O_2/N_2$) | | 5.0 | 6.4 | 5.3 | 5.5 |
| α($CO_2/CH_4$) | | 23 | 21 | 20 | 23 |
| Apparent thickness (Å) | | 410 | 390 | 390 | 420 |
| Tg(°C.) | initial | 195 | 195 | 195 | 195 |
| | reheat | 191 | 191 | 191 | 191 |

*$1 \times 10^6$ cc(STP)/$cm^2$ · sec · cmHg

EXAMPLES 5 to 7

A polymeric solution was prepared using polysulfone in various amounts as in Table 3 below, and a mixed solvent consisting of 50% by weight of NMP and 50% by weight of THF. After removing air bubbles under vacuum (about 10 to 50 torr), the solution was spun by means of a spinning apparatus. At this stage, purified water was used as a bore liquid and a precipitating solution, respectively. The air gap was 1 cm. The spun fiber was dipped into a water bath for 24 hours to remove the solvent. The fiber was removed from the water bath and immersed in a methanol bath for 10 to 24 hours. The film was then dried for 24 to 30 hours at room temperature. The film was subjected to measurement of gas permeability with a bubble flow meter under 5 atm of a pure gas. The results are shown in Table 3 below.

TABLE 3

| Sample | | 5 | 6 | 7 |
|---|---|---|---|---|
| Polysulfone Content (wt %) | | 23 | 25 | 27 |
| P/l($O_2$)* | | 24.2 | 24.7 | 24.8 |
| P/l($N_2$)* | | 4.2 | 4.3 | 4.3 |
| P/l($CO_2$)* | | 34.7 | 36.5 | 36.9 |
| P/l($CH_4$)* | | 1.4 | 1.4 | 1.4 |
| α($O_2/N_2$) | | 5.8 | 5.7 | 5.8 |
| α($CO_2/CH_4$) | | 24.3 | 24.9 | 24.9 |
| Apparent thickness (Å) | | 451 | 445 | 444 |
| Tg(°C.) | initial | 193 | 193 | 193 |
| | reheat | 191 | 191 | 191 |

*$1 \times 10^{-6}$ cc(STP)/$cm^2$ · sec · cmHg

EXAMPLES 8 TO 10

A polymeric solution was prepared using 34% by weight of polysulfone and a mixed solvent consisting of 70% by weight of NMP, 25% by weight of ethyl acetate and 5% by weight of methanol. After removing air bubbles under vacuum (about 10 to 50 torr), the solution was spun by means of a spinning apparatus. At this stage, an aqueous solution of polyethyleneglycol (molecular weight of 600) was used in the amount specified in Table 4 below as a bore liquid, and brine (aqueous solution of LiCl, 0.1% by weight) was used as a precipitating solution. The spun fiber was dipped into a water bath for 24 hours to remove the solvent. The fiber was removed from the water bath and immersed in an ethanol bath and then a hexane bath, for 10 to 24 hours, respectively. The film was then dried for 24 to 30 hours at room temperature. The film was subjected to measurement of gas permeability with a bubble flow meter under 5 atm of a pure gas. The results are shown in Table 4 below.

TABLE 4

| Sample | 8 | 9 | 10 |
| --- | --- | --- | --- |
| Polyethyleneglycol Content in Bore Liquid (wt %) | 2.3 | 3 | 4 |
| P/l(O$_2$)* | 22.6 | 23.3 | 24.2 |
| P/l(N$_2$)* | 4.4 | 5.3 | 5.3 |
| P/l(CO$_2$)* | 28.9 | 31.6 | 35.0 |
| P/l(CH$_4$)* | 1.3 | 1.5 | 1.7 |
| α(O$_2$/N$_2$) | 5.1 | 4.4 | 4.6 |
| α(CO$_2$/CH$_4$) | 21.7 | 20.1 | 20.3 |
| Apparent thickness (Å) | 490 | 470 | 460 |
| Tg(°C.) initial | 193 | 193 | 193 |
| reheat | 190 | 191 | 190 |

*1 × 10$^{-6}$ cc(STP)/cm$^2$ · sec · cmHg

EXAMPLES 11 TO 14

A polymeric solution was prepared using polysulfone in various amounts as in Table 5 below, and a mixed solvent consisting of 53% by weight of DMF and 47% by weight of propyl acetate. After removing air bubbles under vacuum (about 10 to 50 torr), the solution was spun by means of a spinning apparatus. At this stage, water/DMF of a ratio of 82/18 (by weight) and purified water were used as the bore liquid and a precipitating solution, respectively. The air gap was 5 cm. The spun fiber was dipped into a water bath for 24 hours to remove the solvent. The fiber was removed from the water bath and immersed in a methanol bath for 10 to 24 hours. The film was then dried for 24 to 30 hours at room temperature. The film was subjected to measurement of the gas permeability thereof with a bubble flow meter under 5 atm of a pure gas. The results are shown in Table 5 below.

TABLE 5

| Sample | 11 | 12 | 13 | 14 |
| --- | --- | --- | --- | --- |
| Polysulfone Content (wt %) | 25 | 27 | 30 | 35 |
| P/l(O$_2$)* | 29.5 | 28.9 | 29.1 | 28.9 |
| P/l(N$_2$)* | 5.4 | 5.8 | 5.8 | 5.2 |
| P/l(CO$_2$)* | 55.1 | 53.2 | 54.0 | 53.1 |
| P/l(CH$_4$)* | 2.3 | 2.3 | 2.3 | 2.2 |
| α(O$_2$/N$_2$) | 5.4 | 5.0 | 5.0 | 5.6 |
| α(CO$_2$/CH$_4$) | 23.9 | 22.7 | 22.9 | 23.7 |
| Apparent thickness (Å) | 370 | 380 | 380 | 380 |
| Tg(°C.) initial | 195 | 195 | 195 | 195 |
| reheat | 191 | 191 | 191 | 190 |

*1 × 10$^{-6}$ cc(STP)/cm$^2$ · sec · cmHg

EXAMPLES 15 TO 17

A polymeric solution was prepared using polysulfone in various amounts as in Table 6 below, and a mixed solvent consisting of 50% by weight of NMP and 50% by weight of THF. After removing air bubbles under vacuum (about 10 to 50 torr), the solution was spun by means of a spinning apparatus. At this stage, a 3% aqueous solution of polyethyleneglycol having a molecular weight of 600 and purified water were used as a bore liquid and a precipitating solution, respectively. The air gap was 5 cm. The spun fiber was dipped into a water bath for 24 hours to remove the solvent. The fiber was removed from the water bath and immersed in a methanol bath for 10 to 24 hours. The film was then dried for 24 to 30 hours at room temperature. The film was subjected to measurement of a gas permeability with a bubble flow meter under 5 atm of a pure gas. The results are shown in Table 6 below.

TABLE 6

| Sample | 15 | 16 | 17 |
| --- | --- | --- | --- |
| Polysulfone Content (wt %) | 25.8 | 27.9 | 30.2 |
| P/l(O$_2$)* | 32.9 | 29.8 | 31.2 |
| P/l(N$_2$)* | 7.5 | 5.6 | 6.5 |
| P/l(CO$_2$)* | 68.2 | 56.4 | 62.0 |
| P/l(CH$_4$)* | 3.3 | 2.6 | 2.9 |
| α(O$_2$/N$_2$) | 4.4 | 5.3 | 4.8 |
| α(CO$_2$/CH$_4$) | 20.4 | 22.1 | 21.3 |
| Apparent thickness (Å) | 330 | 370 | 350 |
| Tg(°C.) initial | 197 | 197 | 197 |
| reheat | 191 | 191 | 191 |

*1 × 10$^{-6}$ cc(STP)/cm$^2$ · sec · cmHg

EXAMPLES 18 TO 20

A polymeric solution was prepared using polysulfone 30% by weight and a mixed solvent consisting of 52% by weight of NMP, 40% by weight of THF and 8% by weight of ethyl acetate. After removing air bubbles under vacuum (about 10 to 50 torr), the solution was spun by means of a spinning apparatus. A water/THF having the composition specified in Table 7 below and purified water were used as a bore liquid and a precipitating solution, respectively. An air gap was 5 cm. The spun fiber was dipped into a water bath for 24 hours to remove the solvent used. The fiber was removed from the water bath and immersed in a methanol bath for 10 to 24 hours. The film was then dried for 24 to 30 hours at room temperature. The film was subjected to measurement of the gas permeability thereof with a bubble flow meter under 5 atm of a pure gas. The results are as shown in Table 7 below.

TABLE 7

| Sample | 18 | 19 | 20 |
| --- | --- | --- | --- |
| Composition of bore liquid (wt/wt) | 100/0 | 85/15 | 80/20 |
| P/l(O$_2$)* | 31.3 | 33.1 | 31.9 |
| P/l(N$_2$)* | 5.8 | 6.4 | 5.8 |
| P/l(CO$_2$)* | 62.1 | 68.9 | 64.4 |
| P/l(CH$_4$)* | 2.6 | 3.1 | 2.8 |
| α(O$_2$/N$_2$) | 5.4 | 5.2 | 5.5 |
| α(CO$_2$/CH$_4$) | 23.7 | 22.1 | 23.1 |
| Apparent thickness (Å) | 350 | 330 | 340 |
| Tg(°C.) initial | 197 | 197 | 197 |
| reheat | 191 | 190 | 190 |

*1 × 10$^{-6}$ cc(STP)/cm$^2$ · sec · cmHg

EXAMPLES 21 TO 23

A polymeric solution was prepared using polysulfone in various amounts as in Table 8 below and a mixed solvent consisting of 60% by weight of DMF, 38% by weight of THF and 2% by weight of ethanol. After removing air bubbles under vacuum (about 10 to 50 torr), the solution was cast onto a porous nonwoven fabric available from DuPont, USA under the trade designation 1079. (Alternatively, another porous nonwoven fabric available from Freudenberg under the trade designation 2430 may be used for the same purpose.) At this stage, purified water was used as a precipitating solution. The cast film was dipped into a water bath for 24 hours to remove the solvent. The film was removed from the water bath and immersed in an ethanol bath and then an n-hexane bath for 10 to 24 hours, respectively. The film was then dried at room temperature for 24 to 30 hours. The film was subjected to measurement of gas permeability with a bubble flow meter under 5 atm of a pure gas. The results are shown in Table 8 below.

TABLE 8

| Sample | | 21 | 22 | 23 |
|---|---|---|---|---|
| Polysulfone Content (wt %) | | 12 | 16 | 18 |
| P/l($O_2$)* | | 53.4 | 30.2 | 26.4 |
| P/l($N_2$)* | | 35.6 | 6.3 | 5.0 |
| P/l($CO_2$)* | | 72.3 | 52.6 | 48.8 |
| P/l($CH_4$)* | | 60.2 | 2.4 | 2.0 |
| α($O_2/N_2$) | | 1.5 | 4.8 | 5.3 |
| α($CO_2/CH_4$) | | 1.2 | 22.3 | 24.5 |
| Apparent thickness (Å) | | | 362 | 417 |
| Tg(°C.) | initial | 195 | 198 | 197 |
| | reheat | 191 | 191 | 191 |

*1 × $10^{-6}$ cc(STP)/$cm^2$ · sec · cmHg

As mentioned above, the separation membranes according to the invention show good gas permeability and permselectivity which are comparable or superior to conventional separation membranes made of pure polymeric materials. Such advantages are believed to result from the fact that the solvent having low surface tension migrates toward the interface of the polymeric/precipitating solution during the spinning or casting process, and that the solvent is rapidly diffused into the precipitating solution at this interface, thereby causing a considerable increase in the concentration of the polymer. As a result, the polymer becomes denser with exchange of the solvents, thus allowing the membrane to have good permeability and permselectivity.

The integrally skinned asymmetric membrane according to the present invention comprises a defect-free ultrathin selective surface layer having a high free volume as well as a porous support layer having open cells which are capable of permitting resistance to permeation to be reduced, and therefore, has good permeability and high permselectivity.

What is claimed is:

1. A polymeric dope solution for the production of an integrally skinned asymmetric membrane, in either hollow fiber or flat sheet form, made by dry-wet phase inversion, which comprises:

(a) a polymeric material selected from the group consisting of polysulfone, polyethersulfone, polyimide, polyetherimide, and a mixture thereof;

(b) a mixed solvent of a main solvent and a co-solvent, the main solvent being selected from the group consisting of N-methyl pyrrolidone, dimethyl formamide, dimethyl acetamide, and dimethyl sulfoxide, the co-solvent being selected from the group consisting of tetrahydrofurane, dioxane, methylene chloride, methyl acetate, ethyl acetate, propyl acetate, chloroform, and a mixture thereof, and the ratio by weight of the main solvent to the co-solvent being within the range of from about 9:1 to about 1:1; and (c) an additive selected from the group consisting of formic acid, ethanol and methanol;

wherein the ratio by weight of the polymeric material (a) to the mixed solvent (b) is within the range of from about 1:6 to about 2:3.

2. The polymeric dope solution of claim 1, further comprising a bore liquid selected from the group consisting of water, a mixture of water and the mixed solvent, and an aqueous polyethyleneglycol.

* * * * *